United States Patent [19]

Coelho et al.

[11] Patent Number: 5,666,137

[45] Date of Patent: Sep. 9, 1997

[54] PACKED YUV9 FORMAT FOR INTERLEAVED STORAGE AND EFFICIENT PROCESSING OF DIGITAL VIDEO DATA

[75] Inventors: Rohan G.F. Coelho, Hillsboro; Brandon H. Lee, Portland, both of Oreg.

[73] Assignee: Intel Corporation, Santa Clara, Calif.

[21] Appl. No.: 306,196

[22] Filed: Sep. 14, 1994

Related U.S. Application Data

[63] Continuation-in-part of Ser. No. 103,399, Aug. 6, 1993, Pat. No. 5,552,803.

[51] Int. Cl.⁶ .............................. H04N 7/01; H04N 11/20; G09G 5/04; G09G 5/00

[52] U.S. Cl. ....................... 345/155; 345/202; 348/453

[58] Field of Search ........................ 345/153–155, 345/196–203; 348/441, 453, 714–721, 420, 421; H04N 7/01, 11/20

[56] References Cited

U.S. PATENT DOCUMENTS

| 4,982,270 | 1/1991 | Tanaka et al. | 348/396 |
| 5,452,235 | 9/1995 | Isani | 348/429 |

FOREIGN PATENT DOCUMENTS 0358625  3/1990  European Pat. Off. .

Primary Examiner—John K. Peng
Assistant Examiner—John W. Miller
Attorney, Agent, or Firm—William H. Murray; N. Stephan Kinsella

[57] ABSTRACT

A digital color video signal is subsampled into a special YUV block format that arranges the data in small groupings of interleaved V, U, and Y values in a left-to-right, top-to-bottom sequence across a video frame. This format results in significantly-reduced hardware memory requirements in the video reception system. Interpolation or dithering is also used to reduce unwanted artifacts in the resulting images.

20 Claims, 4 Drawing Sheets

FIG. 2
*(PRIOR ART)*

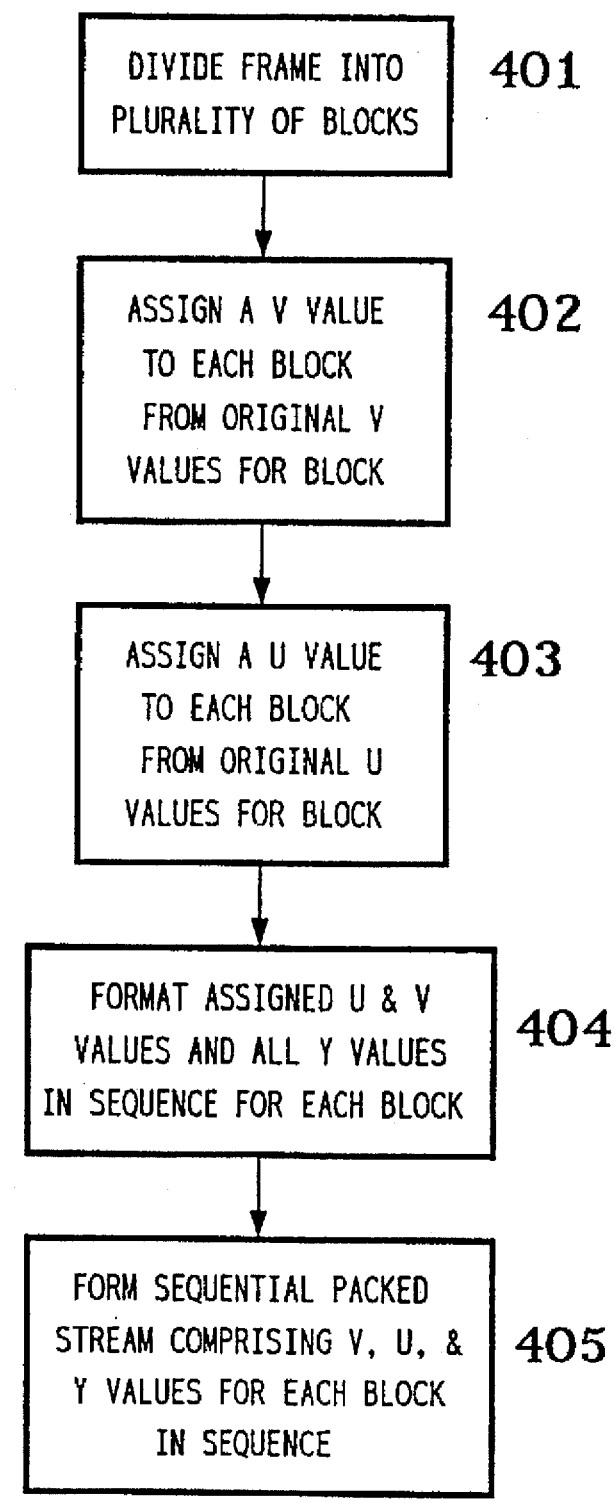

PACKED YUV9 FORMAT FOR INTERLEAVED STORAGE AND EFFICIENT PROCESSING OF DIGITAL VIDEO DATA

BACKGROUND OF THE INVENTION

This is a continuation-in-part of U.S. patent application Ser. No. 08/103,399, filed on Aug. 6, 1993, entitled "Method and Apparatus for Displaying an Image Using System Profiling," now issued as U.S. Pat. No. 5,552,803, issue date Sep. 3, 1996, the entirety of which is incorporated herein by reference.

In digital color imaging systems, a frame of image data is typically divided into a matrix of square "pixels". A typical frame may be 160 pixels wide and 120 pixels deep, and the corresponding resolution of the image is an inverse function of the size of the display device used. Each pixel originates at the video source with a "full data" combination of intensity and color information. A typical "YUV" digital color pixel characterization code will have three separate 8 bit digital words representing the intensity (Y) and the color content (U) and (V) respectively. Hence, a full data color pixel characterization requires 24 bits of digital information. So, for the frame described above, a total of 24×160×120= 460,800 bits are required. This large number is prohibitively high due to the costs involved for the transmission hardware necessary to buffer and process so much data, and due to the relatively long processing time needed.

One way known in the art to deal with this problem is to refrain from sending all the color information. Since the human eye is much less sensitive to color changes than it is to intensity changes, leaving out some of the color information can often be tolerated without serious degradation of the humanly-viewed picture. For example, it is known in the art to break up the frame into 4×4 blocks as depicted in FIG. 1, wherein $B_{11}$ represents the first block in the upper left hand corner. The screen shown thus comprises 30 bands 40 blocks wide. In this format, the original full data Y, U, and V values comprise $(Y_{11} - - - Y_{120\ 160})$, $(U_{11} - - - U_{120\ 160})$, and $(V_{11} - - - U_{120\ 160})$ respectively, but the U and V values are not all sent. Instead, all the U values for $B_{11}$ are set at the original value of $U_{11}$, all the U values for $B_{12}$ are set at the original value of $U_{15}$, all the U values for $B_{21}$ are set at the original value of $U_{51}$, and so on as depicted in FIG. 2. The same scheme is used for the V values, but all the original Y values are retained. With this arrangement 8 bits for U and 8 bits for V give the color information for all 16 pixels in a block, yielding an average of 1 bit per pixel for the color information for each block. Each pixel has the full 8 bits of intensity information, so that the total average number of bits per pixel required using this arrangement is 9—thus the nomenclature "YUV9".

The method known in the art for handling this data comprises storing all the Y values (19,200 of them) for a frame and then all the block U values (1200 of them) and, finally, all the block V values (1200 of them). This is the standard YUV9 "planar" format. This format has two serious drawbacks: (1) all or most of the data for an entire frame must be stored in a buffer prior to doing any manipulations on the data by a processor; and, (2) the resulting image can (not surprisingly) have a "blocky" effect to a human viewer.

SUMMARY OF THE INVENTION

Applicant has discovered an improved technique for formatting YUV subsampled data that provides for reduced buffer storage requirements and higher processing efficiency.

According to one aspect of Applicant's invention, the YUV9 data is formatted as follows: $(V_{11}, U_{11}, Y_{11}, Y_{12}, Y_{13}, Y_{14}, Y_{21}, Y_{22}, Y_{23}, Y_{24}, Y_{31}, Y_{32}, Y_{33}, Y_{34}, Y_{41}, Y_{42}, Y_{43}, Y_{44})$ for block B11, followed by the block V, block U, and Y data for blocks $(B_{12} - - - B_{140})$, $(B_{21} - - - B_{240})$, and so on left-to-right and top-to-bottom across each frame. Once the data in the first block is received and stored, processing can begin immediately on that block's data; interpolating or dithering the $U_{11}$ and $V_{11}$ color values for a more human eye "friendly" appearance of the resulting image; on the contrary, the known "planar format" technique of the prior art requires that all or most of an entire frame's Y, U, and V data be received and stored before any such processing can begin. (The reason being that the conversion of YUV data to RGB data requires all the YUV data for the entire frame.) The data storage requirements prior to processing for Applicant's new format are reduced by a factor of approximately (1/# of blocks per frame), which for the frame depicted in FIG. 1 comes out to a factor of (1/1200).

BRIEF DESCRIPTION OF THE DRAWING

FIG. 2 is an expanded view of the first block of the frame of FIG. 1, along with its adjacent pixels.

FIG. 4 is a block diagram illustrating the functional operation of the video processor of FIG. 3, accordance with an embodiment of the present invention.

DETAILED DESCRIPTION

Figure 1:
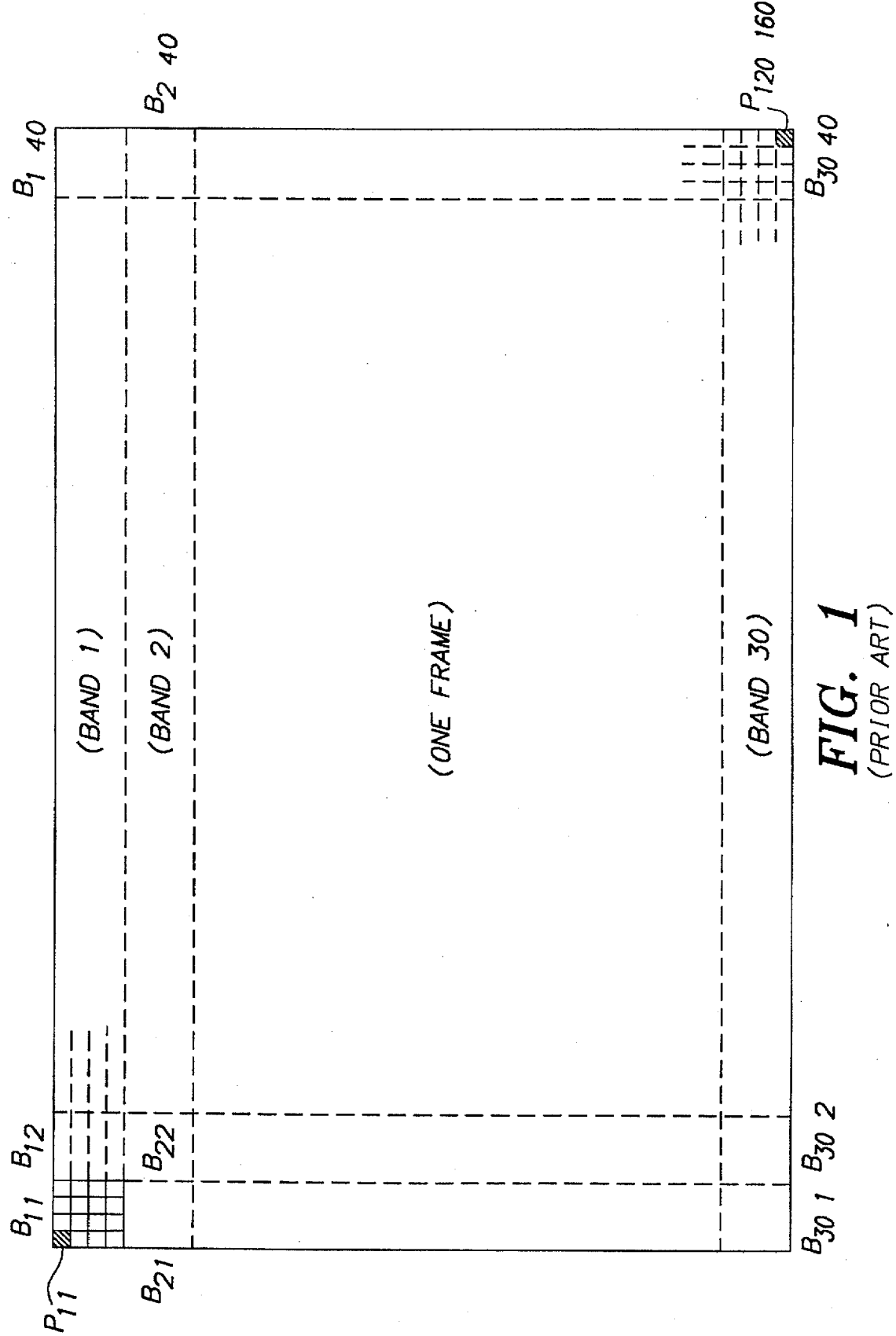
FIG. 1 depicts a typical frame of YUV digital video data.
Figure 2:
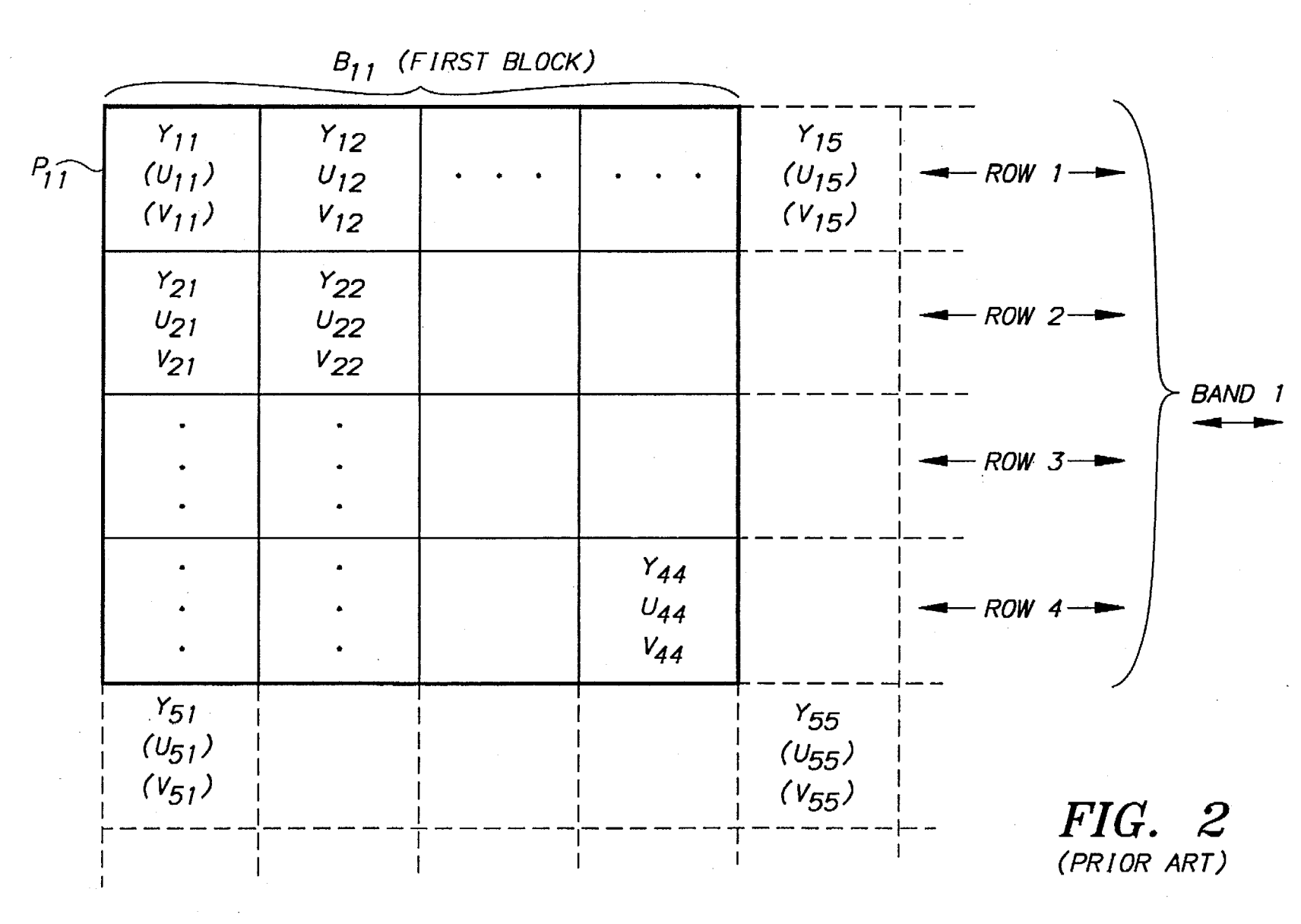

A preferred embodiment of the instant invention can be understood by means of reference to FIGS. 1 and 2 in conjunction with the following description.

A digital video frame containing 160×120=19,200 individual pixels arranged in a rectangular grid with addresses $P_{11}$ through $P_{120160}$ is divided into 1200 square 4×4 groupings called "blocks" and into 30 horizontal strips (of 40 blocks each) called "bands."

The original pixel data is compressed by means of the well-known YUV9 subsampling technique, but the resultant subsampled data is arranged in a novel and highly beneficial "packed" (i.e. interleaved) format for transmission as follows.

The values of $V_{11}$ and $U_{11}$ (for pixel $P_{11}$ in block $B_{11}$) start the data stream, and are followed directly by the 16 Y values for block $B_{11}$ going form left to right and top to bottom within block $B_{11}$. In other words, the transmitted color and intensity data for block $B_{11}$ occurs sequentially as follows: $(V_{11}, U_{11}, Y_{11}, Y_{12}, Y_{13}, Y_{14}, Y_{21}, Y_{22}, Y_{23}, Y_{24}, Y_{31}, Y_{32}, Y_{33}, Y_{34}, Y_{41}, Y_{42}, Y_{43}, Y_{44})$. After this data for block $B_{11}$ is transmitted, then the data for block $B_{12}$ is immediately subsequently transmitted in a corresponding format: $(V_{15}, U_{15}, Y_{15}, Y_{16}, Y_{17}, Y_{18}, Y_{25}, Y_{26}, Y_{27}, Y_{28}, Y_{35}, Y_{36}, Y_{37}, Y_{38}, Y_{45}, Y_{46}, Y_{47}, Y_{48})$. This pattern of data transmission is followed from left to right in Band 1, and then is continued form left to right in Band 2, and so on until the entire frame of YUV data is transmitted.

By use of this packed format, it is possible to start processing the received digital color information for reconstruction and display as soon as the transmission of the data for the entire first block is completed (an exception to this occurs if interpolation is employed, in which case the data for the second block ($B_{12}$) will also be needed before the start of reconstruction processing as described hereinafter).

This constitutes a major advantage over the YUV9 format method of the prior art, which requires the reception and storage of all or most of an entire frame of YUV9 data prior to the start of any desired processing and reconstruction of that data. Since the instant invention allows the desired processing to begin after transmission of only a block or two of data, it is clear that use of this format saves not only receiver memory space, but also saves significant reception and reconstruction time.

During reconstruction (i.e. "upsampling"), the V and U values transmitted for each respective block can be applied directly for each pixel of that respective block. In this case all sixteen pixels in a given block will have the same V values and the same U values, although each pixel's Y value can lie anywhere in the allowed range of Y values, as determined by the originating image. This can result in a humanly-discernable artifact in the reconstructed image commonly referred to as "blockiness." This can be very distracting, and is therefore considered highly undesirable.

In order to overcome "blockiness" in the received and reconstructed image, it is useful to use one of two known techniques in concert with Applicant's new packed YUV9 format. The first is interpolation and the second is dithering.

A useful typical interpolation technique comprises a fractional reconstruction process for the V and U values from block to block in a left to right sequence. For example, the reconstructed $V_{12}$, $V_{22}$, $V_{32}$, and $V_{42}$ values in block $B_{11}$ are defined as $V_{(1-4)2} = (\frac{3}{4} V_{11} + \frac{1}{4} V_{15})$. Similarly, $V_{(1-4)3} = (\frac{1}{2} V_{11} + \frac{1}{2} V_{15})$, and, $V_{(1-4)4} = (\frac{1}{4} V_{11} + \frac{3}{4} V_{15})$, while the $V_{21}$, $V_{31}$, and $V_{41}$ values are given the same value as $V_{11}$. This approach is implemented block by block, left to right and top to bottom for the entire digital video frame reconstruction of interpolated V's and U's to use in conjunction with the respective transmitted Y values to create a reconstructed image that no longer displays a blocky effect.

A useful typical dithering technique involves adding (algebraically) noise to the received V and U values respectively for each block. The V and U values for each pixel in each block (other than the received V and U values for the upper left hand pixel of each block) are given a value somewhat different from the respective received V and U values and generally different from each other. The noise added can amount to an increase or decrease with respect to the received V and U values. The amount and sign of the noise added can either be determined by the processor at random (within specified positive and negative limits) or can be specified by a noise matrix chosen a priori by the system designer. In either case, the result is that the remaining fifteen V values and fifteen U values vary significantly throughout the area of the block. This greatly reduces the likelihood of blocky artifacts in the reconstructed image.

In addition to all the above-described techniques, Applicant has also found that with most available processing equipment it is desirable to align the number of data values in multiples of 4. So for some practical implementations of Applicant's packed YUV9 format it may be useful to insert two "blanks" after the V and U values have been transmitted before sending the corresponding sixteen Y values. In this manner, the total number of transmitted (and received) values for each block is 20 (i.e. a multiple of 4) instead of the originally described set of 18.

It will be understood by those skilled in the art that the packed YUV technique described above can also be used beneficially for the YUV12 (i.e. 2×2 blocks) format and other YUV formats.

Figure 3:
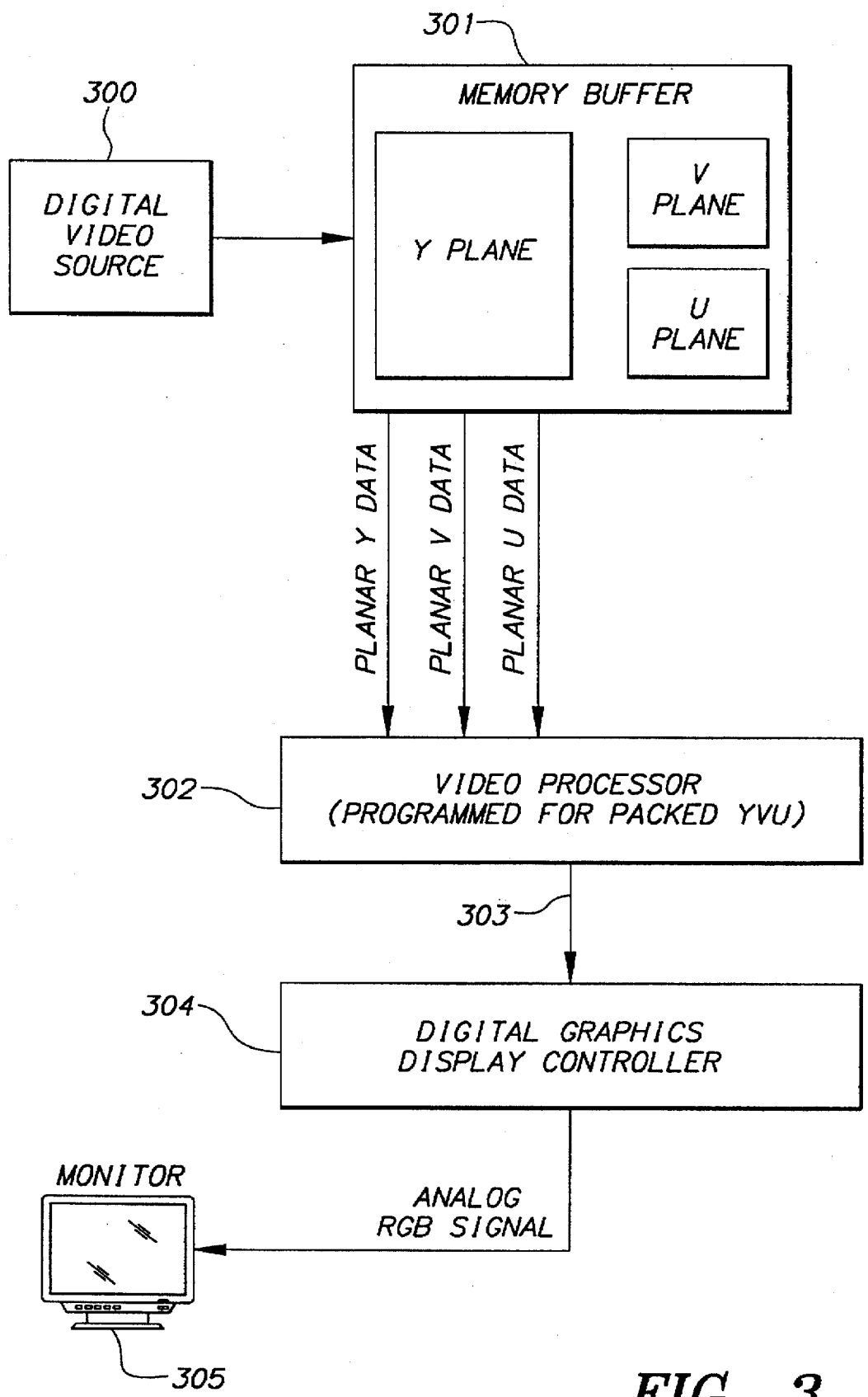
FIG. 3 is a block diagram of a system suitable for implementing the method of the present invention.

FIG. 3 shows a block diagram of a system suitable for implementing the method of the instant invention. Therein, digital video source 300 transmits a digital YUV9 video signal to memory buffer 301. The digital data is stored in memory buffer 301 in standard planar format. Upon command, videoprocessor 302 (which is programmed to convert the planar data to packed YUV data) receives the data in planar form and transmits it along video transmission medium 303 to digital graphics display controller 304. The display controller then sends a corresponding analog RGB signal to video display monitor 305.

FIG. 4 is a block diagram illustrating the functional operation of video processor 302, in accordance with an embodiment of the present invention. As previously disclosed, a frame of original YUV digital video data is divided into a plurality of blocks (block 401). A V value is assigned to each block equal to one of the original V values in the corresponding block of the frame of original YUV digital video data (402), and a U value is assigned to each block equal to one of the original U values in the corresponding block of the frame (403). The assigned U and V values for each respective block are formatted in sequence with all of the Y values corresponding to each respective block in block-by-block fashion (404). A sequential packed digital video data stream is formed, comprising the V, U, and Y values for each of the blocks from in sequence (405).

Applicant's invention is not limited in scope to the above-described embodiments, but rather is defined by the appended claims and their fair equivalents.

What is claimed is:

1. A computer-implemented method for subsampling and formatting a frame of original YUV digital video data for transmission, comprising the steps of:

(A) dividing said frame into a plurality of blocks of pixels;

(B) assigning each block of said plurality of blocks of pixels a V value equal to one of the original V values in the corresponding block of said frame of original YUV digital video data;

(C) assigning each block of said plurality of blocks of pixels a U value equal to one of the original U values in the corresponding block of said frame of original YUV digital video data;

(D) formatting said V and U values assigned in steps (B) and (C) for each respective block in sequence with all of the Y values corresponding to each respective block in block-by-block fashion; and (E) forming a sequential packed digital video data stream comprising the V, U, and Y values for each of said blocks from step (D) in sequence.

2. The method of claim 1 wherein said dividing is determined in accordance with the desired subsampling ratio.

3. The method of claim 1 wherein said blocks of pixels are rectangular in shape.

4. The method of claim 3 wherein said blocks of pixels are square in shape.

5. The method of claim 4 wherein said blocks of pixels each contain sixteen pixels.

6. The method of claim 5 wherein the number of pieces of data associated with each block comprises sixteen Y values, one representative V value, and one representative U value.

7. The method of claim 6 wherein the V and U values assigned to each block in steps (B) and (C) are the original digital video data V and U values corresponding to the pixels in the upper left hand corner of each block.

8. The method of claim 6 wherein the V and U values assigned to each block in steps (B) and (C) comprise averages of more than one of the respective original digital video data V and U values of each block.

9. The method of claim 6, wherein said sequential packed digital video data stream is formed in block-by-block fashion for said frame from left to right and from top to bottom of said frame.

10. The method of claim 6 wherein two blank values are inserted immediately after the V and U values for each block and before the sixteen Y values for each block, so that the total number of values per block is twenty.

11. A system for subsampling and formatting a frame of original YUV digital video data for transmission, comprising:

(A) means for dividing said frame into a plurality of blocks of pixels;

(B) means for assigning each block of said plurality of blocks of pixels a V value equal to one of the original V values in the corresponding block of said frame of original YUV digital video data;

(C) means for assigning each block of said plurality of blocks of pixels a U value equal to one of the original U values in the corresponding block of said frame of original YUV digital video data;

(D) means for formatting said V and U values assigned by means (B) and (C) for each respective block in sequence with all of the Y values corresponding to each respective block in block-by-block fashion; and (E) means for forming a sequential packed digital video data stream comprising the V, U, and Y values for each of said blocks from means (D) in sequence.

12. The system of claim 11 wherein said dividing is determined in accordance with the desired subsampling ratio.

13. The system of claim 11 wherein said blocks of pixels are rectangular in shape.

14. The system of claim 13 wherein said blocks of pixels are square in shape.

15. The system of claim 14 wherein said blocks of pixels each contain sixteen pixels.

16. The system of claim 15 wherein the number of pieces of data associated with each block comprises sixteen Y values, one representative V value, and one representative U value.

17. The system of claim 16 wherein the V and U values assigned to each block are the original digital video data values corresponding to the pixels in the upper left hand corner of each block.

18. The system of claim 16 Wherein the V and U values assigned to each block in steps (B) and (C) comprise averages of more than one of the respective original digital video data V and U values of each block.

19. The system of claim 16, wherein said sequential packed digital video data stream is formed in block-by-block fashion for said frame from left to right and from top to bottom of said frame.

20. The system of claim 16 wherein two blank values are inserted immediately after the V and U values for each block and before the sixteen Y values for each block, so that the total number of values per block is twenty.

* * * * *